United States Patent
Frizzell et al.

[11] 3,890,837
[45] June 24, 1975

[54] ELECTRONIC SIGNAL MULTIPLIER FOR FLOWMETERS

[75] Inventors: Joseph G. Frizzell; Jack R. Hulme, both of Duncan, Okla.

[73] Assignee: Halliburton Company, Duncan, Okla.

[22] Filed: Oct. 29, 1973

[21] Appl. No.: 410,398

Related U.S. Application Data

[62] Division of Ser. No. 286,429, Sept. 5, 1972, Pat. No. 3,796,960.

[52] U.S. Cl. ............................. 73/194 E; 73/231 M
[51] Int. Cl. ............................................. G01f 1/00
[58] Field of Search . 73/194 E, 194 M, 229, 231 R, 73/231 M; 328/20, 38

[56] References Cited
UNITED STATES PATENTS

| | | | |
|---|---|---|---|
| 3,262,069 | 7/1966 | Stella | 328/20 X |
| 3,593,156 | 7/1971 | Jordan | 328/20 |
| 3,601,705 | 8/1971 | Germann et al. | 328/20 X |
| 3,610,898 | 10/1971 | Yamamoto et al. | 73/194 M UX |

Primary Examiner—Charles A. Ruehl
Attorney, Agent, or Firm—L. Lawton Rogers, III; Floyd A. Gonzalez; John H. Tregoning

[57] ABSTRACT

A frequency multiplier for frequency variable electronic signals for use with a fluid flow measuring system. The generally sinusoidal output signal from a fluid flowmeter is converted to a square wave signal of the same frequency. The square wave signal is integrated to form a triangular wave signal variable in both amplitude and frequency with the frequency of the square wave signal. The peak-to-peak amplitude of the triangular wave signal is then adjusted to a predetermined value irrespective of input signal amplitude or frequency in an automatic gain control circuit, and the frequency of the triangular wave is thereafter doubled to the desired value by cascaded doubling stages. Each doubling stage includes a two-channel half-wave rectifier, means for shifting the bias of the rectified waves, and means for both inverting one of the bias shifted waves and for combining the inverted wave with the other bias shifted wave to center the combined wave about a zero volt axis. In an alternative embodiment, with the output signal from the flowmeter in the form of a series of constant amplitude, constant width, variable recurrence rate pulses, a reversible ramp generator is used to form a triangular wave signal having an amplitude and a frequency variable with the frequency of pulse recurrence. The peak-to-peak amplitude of this triangular wave is likewise adjusted to a predetermined constant value and the frequency multiplied in cascaded doubling stages as described above.

9 Claims, 9 Drawing Figures

PATENTED JUN 24 1975 3,890,837
SHEET 1
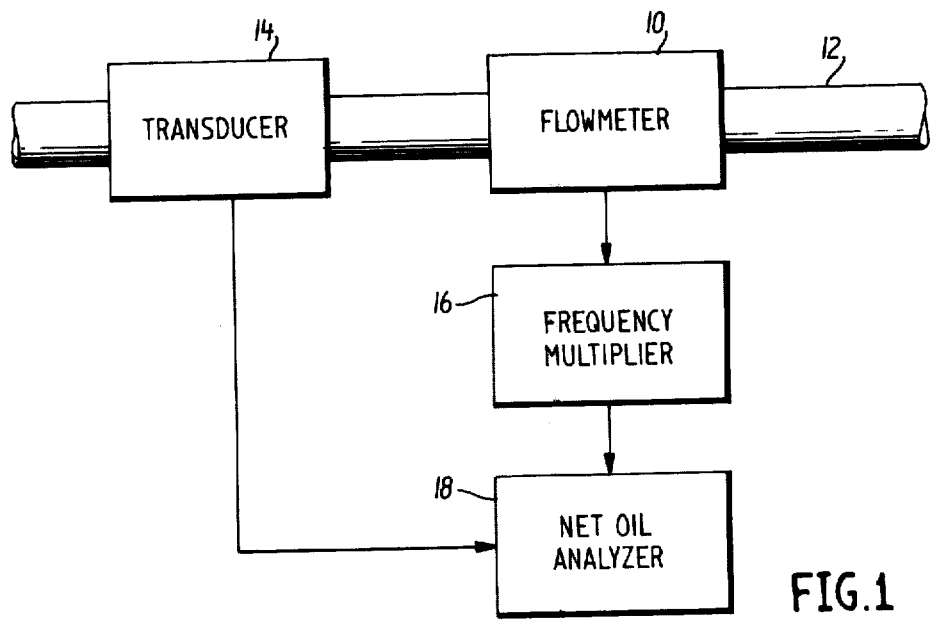
FIG.1
FIG.2
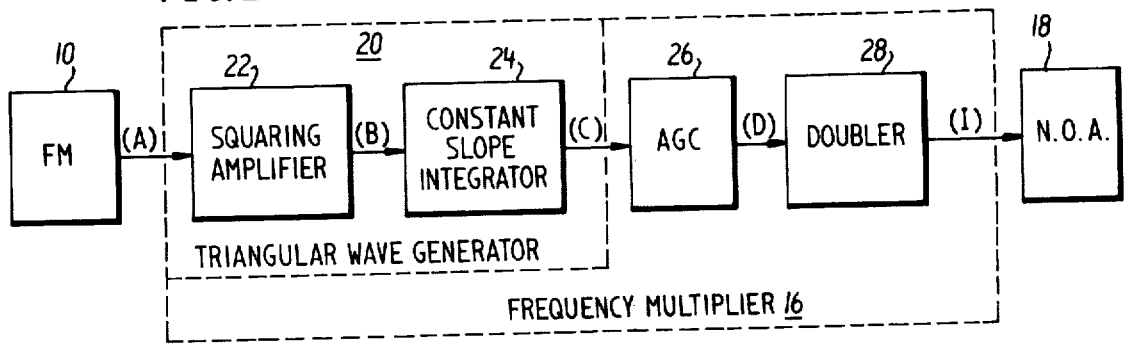
FIG.7
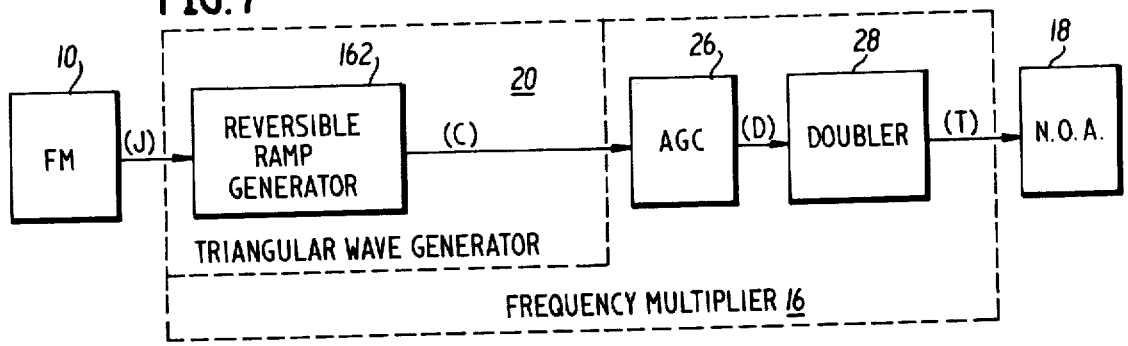

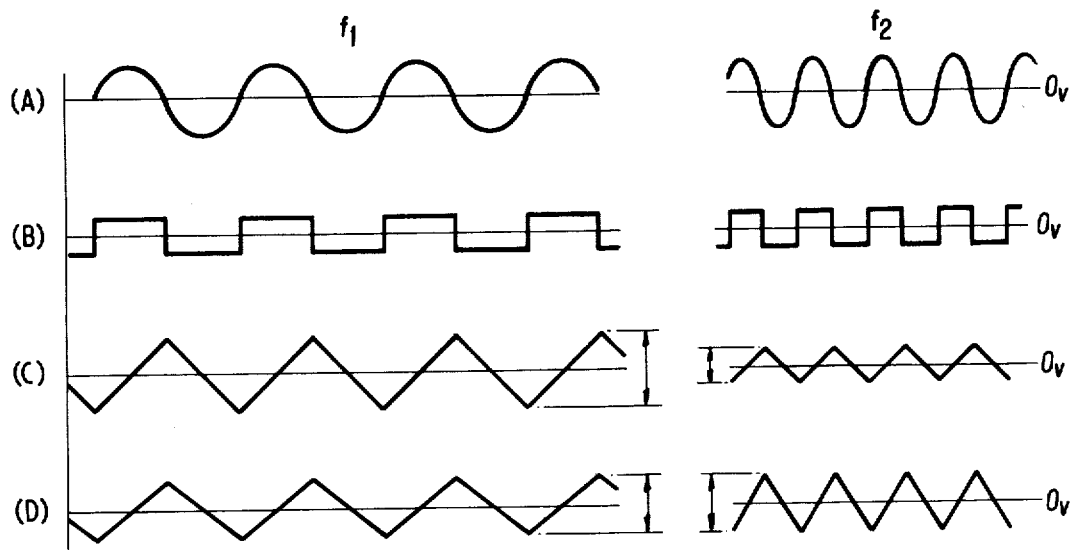
FIG. 3
FIG. 6
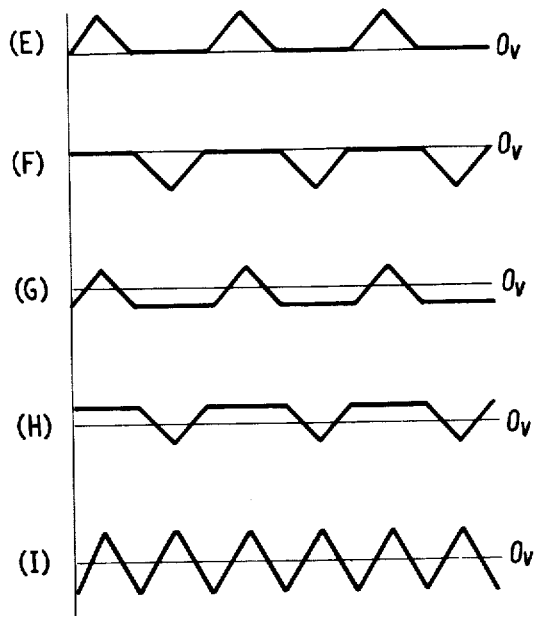
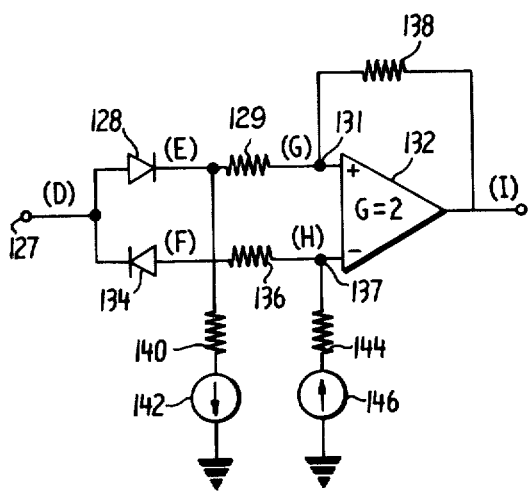
FIG. 5

ELECTRONIC SIGNAL MULTIPLIER FOR FLOWMETERS

This is a division of application Ser. No. 286,429, filed Sept. 5, 1972, now U.S. Pat. No. 3,796,960.

BACKGROUND OF THE INVENTION

The present invention relates to a method and apparatus for generating a periodic signal having a predetermined frequency relationship with an input signal, and more specifically, to a method and apparatus for multiplying the frequency of a variable frequency electronic signal.

It is often desirable to increase the frequency of a periodic signal, such as a sine wave or series of pulses, particularly where the frequency of the signal varies over a wide range in response to a sensed physical condition.

One situation in which it may be desirable to increase the frequency of a signal and in which the frequency of the signal varies widely and rapidly in response to a sensed condition is in the fluid flow measuring art. For example, the flow of fluid through a conduit may be monitored by a turbine flowmeter which generates a generally sinudoidal waveform having a frequency related to the volume fluid flowing through conduit. consuit. The frequency of the output signal generated by the turbine flowmeter approaches zero when the flow through the conduit is minimal and may exceed 2,000Hertz when there is a substantial flow through the conduit. The frequency range of the output signal from the flowmeter therefore makes difficult frequency multiplication which can improve the resolution of fluid flow measuring systems.

One application of the frequency multiplication in which improved resolution is desired is in the "proving" of flowmeters against an accepted standard. Turbine flowmeters are utilized extensively to monitor oil flow from off-loading tankers as well as from storage tank to storage tank transfers. As a matter of current practice which may be required by law in specific situations, it is necessary to check the accuracy of turbine flowmeters once every two weeks or more frequently to assure the operability and accuracy thereof. Under current American Petroleum Institute (API) standards, the volume of fluid as calculated from flowmeter output signals must be within ± 0.02% of the actual volume.

One of the methods of measuring actual volume without disruption of main line flow includes the use of a mechanical displacement "prover" which basically includes a calibrated section of pipe and displacer which may be either a piston or a sphere inserted into the calibrated section of pipe. Detector switches are located at two spaced points on the calibrated pipe section for detecting the passage of the displacer as it is moved through the pipe by the pipeline fluid. The movement of the displacer from one of the points to the other displaces a known volume of fluid, referred to as the "actual volume". It is with this actual volume that a calculated volume derived from the flowmeter output signal is compared.

In general, the flowmeter under test is located upstream of the calibrated pipe section. During testing, the generally sinusoidal signal from the flowmeter is converted into a series of pulses having a repetition rate related to the frequency of the sinudoidal output signal. This series of pulses is applied to a counter which is enabled when the displacer passes the first detector switch and disabled when the displacer passes the second displacer switch. The number of pulses counted is then converted through use of the appropriate meter factor, i.e., pulses/volume, into a calculated fluid volume which must agree with ± 0.02% of the actual volume of fluid displaced in the calibrated pipe section between the two switch locations.

According to API standards, at least 10,000 pulses must be counted per measurement in order to obtain the required resolution. When flow rates are low, considerable sampling time is required to obtain the required minimum number of pulses. If the frequency of the flowmeter utilized were increased, the number of pulses generated therefrom could be increased to meet API standards in a more acceptable time period even for low flow rates. In addition, much greater resolution is achieved with higher frequencies since the number of pulses per unit volume and for time is significantly increased.

Frequency multiplication of fluid flowmeter output signals is also particularly important in increasing the resolution of the net oil analyzers which determine the net oil in the effluent from a producing oil well. A system of this type is described and claimed in U.S. Pat. No. 3,566,685 issued to C. W. Zimmerman et al on Mar. 2, 1971, assigned to the assignee hereof. Accurate frequency multiplication of flowmeter output signals over a wide range of output signal frequencies is required to accurately resolve low flow rate in systems of this type where a condition of the fluid is sampled as a function of volume, and where both the condition and the volume rapidly fluctuate over a wide range.

A great many of the prior analog frequency multiplying circuits require tuning of the circuit when the input signal thereto changes in frequency. Because of the tuning problem, these circuits are difficult to design for multiplying variable frequency signals. Moreover, the frequency range of tuned circuit frequency multipliers is generally severely limited by the frequency range of the tuned circuits. Even though there exist frequency multiplying systems which can respond to variable frequency input signals, either automatic tuning circuits or additional filter circuits are necessary to accommodate input signal frequency shifts. These circuits introduce an increased cost, bulk, and circuit instabilities into the frequency multiplication circuit and are generally unacceptable in net oil analyzers or in other applications where input signal frequencies vary widely.

Digital frequency multiplication has also been used to multiply the frequency of input signals by such techniques as splitting square wave signals, using countdown circuits in a feedback path, using delay lines, using phase locked loops, using coincidence detection circuits, and using waveform combining or shifting circuits. These techniques also suffer from frequency range limitations due to limited counter capacities and delay line lengths. Thus the prior digital circuits are generally inadequate for net oil analysis systems because of limited input signal frequency range.

One of the ways in which an input signal can be multiplied is by successive frequency doubling. This has been accomplished by successive doubling stages without the use of tuned circuits or digital processing, when the input signal frequency is constant. However, when the input signal frequency varies, frequency dependent biasing adjustments must be made at each successive stage. This is particularly difficult when full wave rectification is used for frequency doubling purposes.

For example, consider a variable frequency triangular wave signal (used because of the ease of conversion into a uniform duty cycle pulse train) generated in response to a variable freqency input signal either by the constant slope integration of a square wave, or by a reversible ramp generator. As the frequency of the input wave decreases, the peak-to-peak amplitude of the triangular wave output signal increases due to the charging functions of the capacitors used in these circuits. The variation in amplitude with a corresponding change in input signal frequency presents two problems with respect to serial doubling. The first is associated with very low input frequencies, where the peak-tp-peak amplitude of the output signal from one doubler stage may exceed the input range of succeeding doubler stages. Secondly, the biasing necessary to convert a frequency doubled signal to one having a 50% duty cycle so that it is centered about a "zero" volt axis to allow follow-on doubling varies with input signal frequency. Circuits for changing the biasing in doubling stages as a function of frequency are generally complex and of limited circuit stability in the hostile environment of an oil field.

Thus, in the above-mentioned flowmeter application, where fluid flow varies widely and often approaches zero, the amplitude of the output signal from a triangular wave generator is likely to exceed the permissible input amplitude to the frequency doubling circuits, and the wide variation in amplitude presents severe biasing problems.

It is therefore an object of this invention to obviate many of the deficiencies of known circuits and to provide a novel frequency multiplying method and circuit in which a wide range of input signal frequencies can be accommodated.

It is another object of this invention to provide a novel frequency multiplier and method for serially doubling the frequency of frequency variable electronic signals while preserving the waveform of the signal.

It is a still further object of this invention to provide a novel fluid volume metering method and system including a flowmeter in which the output frequency of the signal from the flowmeter is multiplied in an untuned circuit, without complicated biasing circuitry.

It is still another object of this invention to provide a novel frequency multiplier for use in proving fluid flowmeters.

These and many other objects and advantages of the present invention will be apparent to one skilled in the art to which the invention pertains from the claims and from a perusal of the following detailed description when read in conjunction with the appended drawings.

THE DRAWINGS

FIG. 1 is a basic functional block diagram of a net oil analyzer incorporating the frequency multiplying means of the present invention to increase the frequency of the output signal from a flowmeter, thereby to increase the resolution of the net oil analyzer;

FIG. 2 is a functional block diagram of one embodiment of the frequency multiplier of the net oil analyzer of FIG. 1;

FIG. 3 is a timing diagram illustrating waveforms occurring at various stages in the frequency multiplier of FIG. 2 indicating the effects of input signal frequency variation on the peak-to-peak amplitude of the generated triangular wave signal;

FIG. 5 is a schematic circuit diagram of one of the doubler circuits of FIG. 4;

FIG. 6 is a timing diagram illustrating the operation of the doubler circuit of FIG. 5;

FIG. 7 is a functional block diagram of a second embodiment of the frequency multiplier of the net oil analyzer of FIG. 1;

DETAILED DESCRIPTION

Figure 4:
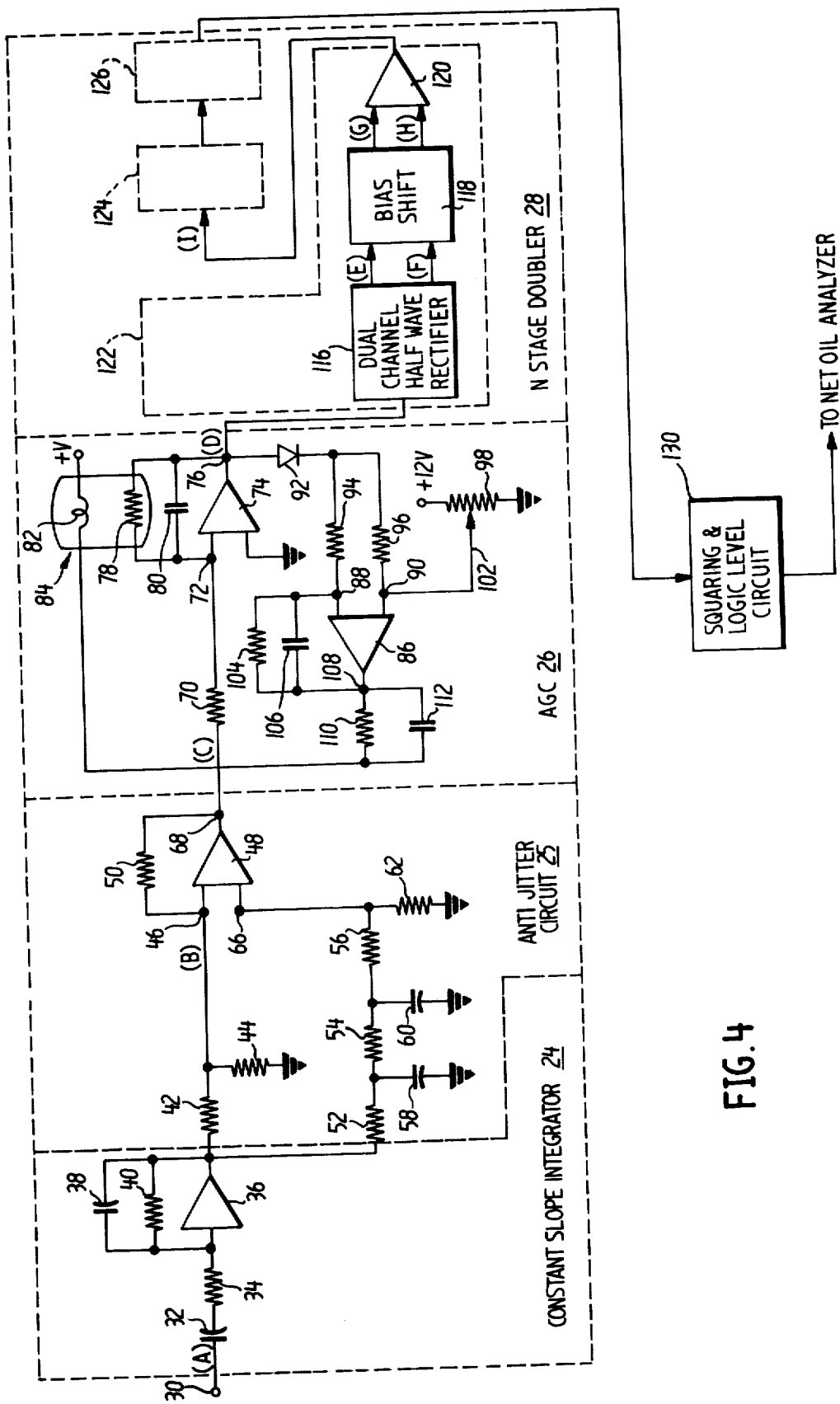
FIG. 4 is a schematic circuit diagram of the frequency multiplier circuit of FIG. 2.

With reference to FIG. 1, a flowmeter 10 is disposed in a fluid conduit 12 in which a condition responsive transducer 14 is also disposed. The output signal from the flowmeter 10 may be connected through a frequency multiplier 16 to one input terminal of a net oil analyzer 18. The output signal from the transducer 14 may be connected to the other input terminal of the net oil analyzer 18.

The flowmeter 10 may be any suitable conventional flowmeter and is desirably of the type claimed in the Groner et al. U.S. Pat. No. 3,164,020 assigned to the assignee hereof. Likewise, the transducer 14 may be any suitable conventional transducer such as that claimed in Love et al. U.S. Pat. No. 3,253,245 and Zimmerman et al. U.S. Pat. No. 3,800,242 issued Aug. 4, 1970, and Mar. 26, 1974, respectively and assigned to the assignee hereof. The net oil analyzer may be of the type claimed in the first mentioned Zimmerman et al. patent.

With reference to FIG. 2, the generally sinusoidal output signal of the flowmeter 10 may be applied to a triangular wave generator 20 which may include a squaring amplifier 22, in general comprised of hard clipping and amplifying circuits, and which may be of the type described hereinafter in connection with FIG. 4. The output signal from the squaring amplifier 22 is a square wave signal having a 50% duty cycle and is applied to a constant slope integrator 24 to produce a triangular shaped output signal.

The output signal from the generator 20 is a triangular wave signal having a frequency equal to that of the square wave input signal and a peak-to-peak amplitude proportional to the input signal frequency. This signal also has a 50% duty cycle. The triangular wave signal is applied to a wide band automatic gain control (A.G.C.) circuit 26 where its amplitude is adjusted to a predetermined constant peak-to-peak value, thereby modifying the slope of the triangular wave signal but leaving the frequency relationship with the input signal unchanged. This gain adjusted signal is then applied to a doubler 28 hereinafter to be described in connection with FIG. 5.

The operation of the circuit of FIG. 2, and the effects of the frequency of the input signal on peak-to-peak amplitudes, may be understood by reference to the timing diagram of FIG. 3 where input signals of two different frequencies are illustrated.

With reference now to FIGS. 2 and 3, the output signal from the flowmeter 10 is illustrated as waveform (A) in FIG. 3. This signal is converted in the squaring amplifier 22 to the 50% duty cycle square wave illustrated in FIG. 3 as waveform (B). Waveform (B) corresponds to waveform (A) in frequency but may have a predetermined amplitude. By the term "50% duty cycle" is meant that waveform excursions occur above and below a reference potential in which the areas under the waveform curve are equal above and below this reference potential.

Waveform (B) of FIG. 3 is converted in the constant slope integrator 24 of FIG. 2 to a triangular waveform as illustrated in FIG. 3 (C). Waveform (C) is a 50% duty cycle signal corresponding in frequency to the frequency of waveform (B). As is readily apparent from the illustration of FIG. 3, the peak-to-peak amplitude of waveform (C) is a function of the frequency of waveform (B) in that the duration of the integrated pulses determines the amplitude of a constant slope waveform. Since the integrator is of the constant slope type, the ramp generated will be longer with lower frequency signals making the peak-to-peak amplitude of the integrated signal larger. It will be apparent, therefore, that the peak-to-peak amplitude of an integrated square wave is a linear function of the frequency of the square wave. This amplitude dependency on frequency makes difficult the doubling of the frequency of a triangular waveform generated in this manner because, as will be described, biasing of follow-on doubling stages will vary with frequency due to the variability of the amplitude of input signals applied thereto.

The output signal [waveform (C)] of the constant slope integrator 24 is therefore applied to the A.G.C. circuit 26 for conversion to a 50% duty cycle triangular waveform having a predetermined constant peak-to-peak amplitude irrespective of the amplitude of the input signal. As illustrated in waveform (D) in FIG. 3, the frequency of the amplitude adjusted triangular waveform (D) is the same as that of waveform (C), with the gain adjustment producing a slope which varies with the frequency of waveform (C).

Waveform (D) is therefore an amplitude adjusted triangular wave signal having a frequency equal to that of the input signal and which is centered about a zero reference potential axis to permit doubling by doubler stages, each including a two channel half-wave rectifier which cannot operate unless the input signal has both positive and negative waveform excursions. As will be described, the dual channel rectifier generates oppositely polarized half-wave rectified signals which are bias shifted. One of the bias shifted waves is inverted and combined with the non-inverted bias shifted wave. The resulting signal is equivalent to a full-wave rectified signal which has been bias shifted to a 50% duty cycle for frequency doubling purposes.

A more complete block diagram of the frequency multiplier 16 of FIG. 2 is shown in FIG. 4. With reference to FIG. 4, an input signal from the flowmeter 10 of FIG. 2 is applied through a conventional squaring amplifier 22 to an input terminal 30 of a constant slope integrator 24. The signal applied to the input terminal 30 is coupled through an input capacitor 32 and a resistor 34 to an amplifier 36. The amplifier 36 is shown to have a feedback circuit including a capacitor 38 in parallel with a resistor 40. The output signal from the amplifier 36 is coupled through a resistor network including resistors 42 and 44 to an input terminal 46 of an amplifier 48 within an anti-jitter circuit 25. The output signal from the amplifier 36 is also coupled to a filter network within the anti-jitter circuit 25 which includes series connected resistors 52, 54, 56, and capacitors 58 and 60 connected from the interconnection thereof to ground. The resistor 56 is connected to an inverting input terminal 66 of the amplifier 48 and the terminal 66 is grounded through a resistor 62.

The amplifier has a resistor 50 coupled feedback circuit between an output terminal 68 and an input terminal 46. The output terminal 68 of the amplifier 48 is connected through a resistor 70 to an input terminal 72 of an amplifier 74 in the automatic gain control circuit 26. The output signal at the output terminal 76 of the amplifier 74 is limited in peak-to-peak value by a feedback circuit including a resistor 78 and a capacitor 80 connected in parallel. The resistor 78 in this feedback circuit is a photoresistor whose value depends on the quantum of radiant energy received from a lamp filament 82.

The output terminal 76 of the amplifier 74 is connected to the filament 82 through a gain control feedback circuit which includes an amplifier 86 and input terminals 88 and 90. The signal at output terminal 76 is applied to the terminal 88 through a diode 92 and a resistor 94, and the terminal 90 through the diode 92 and a resistor 96. The input terminal 90 of the amplifier 86 is biased by the tap 102 of a potentiometer 98 connected between a source of positive 12 volt potential and ground. The potentiometer 98 determines the peak-to-peak amplitude of the signal generated at the output terminal 76.

The output terminal 108 of the amplifier 86 is connected to the input terminal 88 through a feedback circuit comprising a resistor 104 and a capacitor 106 connected in parallel. The output terminal 108 is also connected through a parallel connected resistor 110 and capacitor 112 to the filament 82. The resistor 110 and capacitor 112 together form a compensating network for improving the transient characteristics of the control system by cancelling a pole at the transfer function of the radiant energy coupling device.

The output terminal 76 of the automatic gain control circuit 26 is coupled to an N stage doubler 28. Each stage of the doubler includes a dual channel half-wave rectifier 116 connected through a bias shifting network 118 to an amplifier 120 having inverting and non-inverting input terminals. The dual channel half-wave rectifier 116, the bias shifting unit 118, and the amplifier 120 constitutes one doubler stage 122 of the N stage doubler. In this Figure, the N stage doubler includes two additional doubling stages 124 and 126 which may be identical in circuitry and operation to the doubler stage 122.

The output signal from the last doubler stage 126 of the doubler 28 is applied to a conventional squaring and logic level 130 which reconverts the triangular waveform to a waveform compatible with the net oil analyzer. The squaring and logic level circuit 130 may thus provide a series of constant amplitude pulses responsively to the doubled triangular wave signal substantively described in connection with FIG. 6(1). In other words, the circuit 130 may convert the frequency doubled triangular wave signal to a square wave signal.

In operation and with continued reference to FIG. 4, the squaring amplifier 22 (not shown) is basically a hard clipping circuit which automatically limits the instantaneous value of the output signal therefrom to a predetermined maximum value. With 50% duty cycle sinusoidal input signal illustrated in FIG. 3(A) at the input terminal 30, the output of the squaring amplifier 22 is a square wave signal having a 50% duty cycle as shown in FIG. 3(B). The output signal from the output terminal of the integrating amplifier 36 is also coupled to the anti-jitter circuit 25 which functions as a frequency modulation (F.M.) filter network to provide an offset bias to the amplifier 48. The purpose of this F.M. filter is to prevent the offset from a zero reference potential of the triangular wave output signal from the integrator 74 by "jitter", i.e., a horizontal displacement of the leading or trailing edges of the square wave output signal from the amplifier 22. The d.c. offset voltage provided by the anti-jitter circuit centers the integrator output signal about the zero reference potential axis to provide an output signal having a 50% duty cycle.

The integrator 24 may be a conventional constant slope integrator which incorporates a capacitor charged with a constant current in a direction dependent upon the polarity of the square wave input signal at the input terminal 30. A triangular wave signal may thus be generated at the output terminal 68 as shown in waveform (C) of FIG. 3.

Since the peak-to-peak amplitude of the signal at the output terminal 68 is frequency dependent, the output signal of the anti-jitter circuit 25 is coupled to the wide band automatic gain control circuit 26 where the electrooptical feedback path is utilized because of the smoothing function inherent in its operation. However, any other wide band automatic gain control circuit may be substituted for the circuit illustrated.

The peak-to-peak amplitude adjusted signal from the output terminal 76 is coupled to the N stage doubler 28 which operates as a full-wave rectifier and bias shifter to maintain centering of the waveform about a zero reference potential axis as will be hereinafter explained in more detail in connection with FIG. 5.

With reference to FIG. 5, the input signal applied to the input terminal 127 is applied through a diode 128 and a resistor 129 to the non-inverting input terminal 131 of an amplifier 132. The input signal is also applied through a diode 134 and a resistor 136 to the inverting input terminal 137 of the amplifier 132. The output signal from the amplifier 132 is fed back through a resistor 138 to the non-inverting input terminal 131. The diode 128-resistor 129 interconnection is grounded through a resistor 140 and a source 142 of negative current. Similarly, the diode 134-resistor 136 interconnection is grounded through a resistor 144 and a source 146 of positive current.

In operation, and with reference to the circuit of FIG. 5 and to the waveforms illustrated in FIG. 6, the triangular waveform of FIG. 3(D) is half-wave rectified by the back diodes 128 and 134 to provide the waveform illustrated in FIG. 6 as waveform (E) and waveform (F). To center the output waveform of the amplifier about a zero reference potential axis, a constant bias must be added to or subtracted from these half-wave rectified signals. This is accomplished by a bias shifting network which includes the resistors 140 and 144 and the sources 142 and 146 which function to subtract an appropriate d.c. bias from the waveform (E) to produce the waveform (G) of FIG. 6. Similarly, a d.c. bias is added to the waveform (F) to provide the waveform (H) of FIG. 6.

Both of the half-wave rectified signals are thus centered about a zero volt axis. These bias shifted signals are then applied respectively to the non-inverting and inverting input terminals of the amplifier 120 to produce a composite waveform centered about the zero volt axis and having a frequency which is double that of the input signal illustrated as waveform (D).

The amplifier 132 desirably has a gain of two so that the peak-to-peak amplitude of the output signal illustrated in FIG. 6(I) will be equal to the peak-to-peak amplitude of the input signal illustrated in FIG. 3(D). The additional doubler stages 124 and 126 of FIG. 4 may therefore be equal in circuitry and operation, since biasing for all of the doubler stages will be identical due to the equality of input signal and output signal amplitudes of each doubling stage.

Should the flowmeter utilized in the system shown in FIG. 1 generate a series of pulses such as illustrated in FIG. 9(J) rather than a sinusoidal signal such as illustrated in FIG. 3(A), the system illustrated in FIG. 7 may be used. Referring to FIG. 7, the flowmeter 10 is connected to a triangular generator 20 which functions to provide the waveform (C) of FIG. 3 as does the triangular wave generator 20 of FIG. 2. The triangular wave generator 20 of FIG. 7 may include a reversible ramp generator 162 for generating the appropriate triangular waveform.

Figure 8:
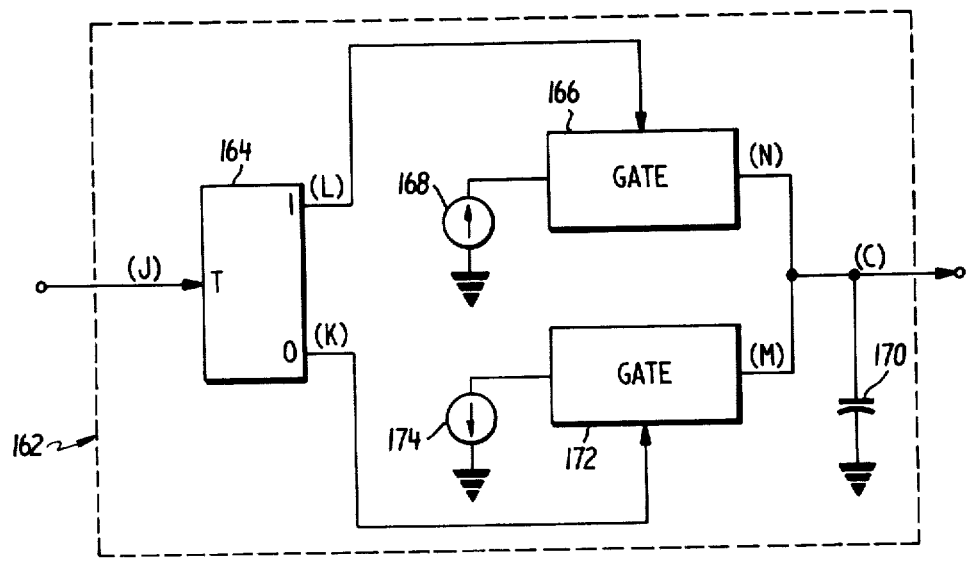
FIG. 8 is a functional block diagram of the reversible ramp generator of FIG. 7; and, FIG. 9 is a timing diagram illustrating the operation of the generator of FIG. 8.

As shown in FIG. 8, the reversible ramp generator 162 may include a binary element or flip-flop 164 triggerable from one state to another in response to the application of an input signal to the trigger input terminal T thereof. The true output terminal of the flip-flop 164 is connected to the control terminal of a gate 166 connected between a conventional source 168 of positive constant current and a capacitor 170. The false output terminal of the flip-flop 164 is connected to a gate 172 between a conventional source 174 of negative constant current and the capacitor 170.

Figure 9:
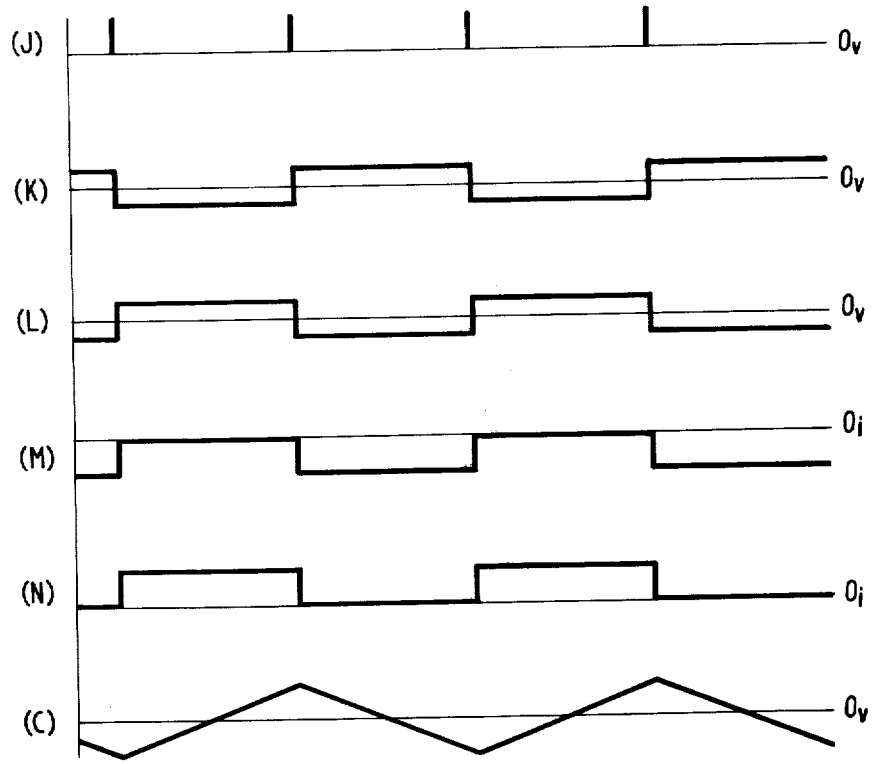

In operation and with reference to FIGS. 8 and 9, the pulse waveform of FIG. 9(J) is utilized to toggle the flip-flop 164 to produce the complementary waveforms of FIGS. 9(L) and 9(K) respectively on the true and false output terminal thereof. The gates 166 and 172 are operative in response to a high signal level to pass respectively the current provided by the associated sources 168 and 174 to the capacitor 170. The output signals from the gates 166 and 172 are thus current pulses of constant amplitude but opposite polarity as illustrated respectively in FIGS. 9(M) and 9(N). The integration of these signals by the capacitor 170 provides the triangular waveform illustrated as waveform (C) in FIGS. 9 and 3.

ADVANTAGES AND SCOPE OF THE INVENTION

The present invention is a wide band frequency multiplying system which has been described in connection with a net oil analyzer. The invention is particularly suited for use in the hostile environment of an oil field where the equipment is often abused and subject to a wide range of temperature changes. The biasing of its doubler stages is independent of input signal frequency, and circuit complexity is materially reduced. The use of the triangular waveform provides for similarity in input and output waveforms of each of the doubling stages, greatly facilitating serial doubling. The present invention may, of course, be embodied in other specific forms without departing from the spirit or essential characteristics thereof. The presently disclosed embodiments are therefore to be considered in all respects

What is claimed is:

1. Apparatus for multiplying the frequency of the output signal from a fluid flowmeter means in which the frequency is variable as a function of fluid flow through the flowmeter means, comprising:
   means for generating a square wave signal corresponding in frequency to the frequency of said flowmeter means output signal;
   means for integrating said square wave signal for providing a triangular wave signal related in both peak-to-peak amplitude and frequency to the frequency of said output signal;
   means for adjusting the peak-to-peak amplitude of said triangular wave signal to a predetermined constant value while leaving the frequency thereof unchanged; and
   doubling means including means for simultaneously full wave rectifying said amplitude adjusted triangular wave signal and biasing the full wave rectified signal by an amount sufficient to center it about a zero reference potential axis, thereby to provide a triangular wave signal having a frequency double that of said output signal.

2. The apparatus of claim 1 and and further including means for generating pulses having a predetermined amplitude and a repetition rate corresponding to the frequency of said bias shifted rectified signal, whereby counting of the numbers of said pulses indicates said flow rate.

3. The apparatus of claim 2 wherein said flowmeter means includes means for sensing said flow rate and for generating a sine wave output signal having a frequency proportional to said flow rate.

4. The apparatus of claim 3 wherein said means for generating a square wave signal is a hard clipping circuit operatively connected to said sine wave signal generating means.

5. The apparatus of claim 3 wherein said means for generating a square wave signal further includes means for reducing leading and trailing edge variations which generate duty cycle variations in said square wave signal.

6. The apparatus of claim 1 and further including means for converting said frequency-doubled triangular wave signal to a square wave signal.

7. A method for measuring variations in the flow rate of fluid in a channel comprising the steps of:
   sensing said fluid flow and generating an electrical signal having a frequency proportional to said flow rate, the frequency of said electrical signal varying between a predetermined minimum and maximum;
   generating a square wave signal varying in frequency with that of said electrical signal;
   integrating said square wave signal over time to provide a triangular wave signal having both a peak-to-peak amplitude and a frequency of said square wave signal;
   maintaining the peak-to-peak amplitude of said triangular wave signal at a predetermined level regardless of the frequency of said electrical signal so as to form a constant peak-to-peak amplitude signal;
   generating a triangular wave signal having a frequency which is a predetermined multiple of the frequency of said constant peak-to-peak amplitude signal; and
   generating a pulse train having a pulse repetition rate corresponding in frequency to that of said last mentioned signal, whereby the number of pulses generated is proportional to said flow rate.

8. A frequency multiplier for use in a system for proving the accuracy of a fluid flowmeter by counting the number of pulses derived from the flowmeter output signal over a period of time related to the displacement of a predetermined volume of fluid comprising:
   means for generating a triangular wave signal related in both peakto-peak amplitude and frequency to the repitition rate of the pulses derived from the flowmeter output signal;
   means for adjusting the peak-to-peak amplitude by said triangular wave signal to a predetermined constant value leaving the frequency thereof unchanged;
   means for doubling the frequency of said adjusted triangular wave signal; and,
   means for generating pulses responsively to the doubled triangular wave signal, whereby the number of pulses effectively derived from the flowmeter output signal may be increased thereby increasing the resolution of the flowmeter proving system.

9. The apparatus of claim 8 wherein said doubling means includes:
   means for full wave rectifying said amplitude adjusted triangular wave signal, and for biasing the full wave rectified signal by a predetermined amount sufficient to center it about a zero reference potential to thereby provide a triangular wave having double the frequency of said first mentioned triangular wave.

* * * * *